United States Patent
Sun et al.

(10) Patent No.: US 7,646,340 B2
(45) Date of Patent: Jan. 12, 2010

(54) METHOD FOR PROCESSING ARRAY ANTENNA SIGNAL

(75) Inventors: Changguo Sun, Qingpu District (CN);
Yingmin Wang, Qingpu District (CN);
Guiliang Yang, Qingpu District (CN)

(73) Assignee: Shanghai Ultimate Power Communications Technology Co., Shanghai (CN)

(*) Notice: Subject to any disclaimer, the term of this patent is extended or adjusted under 35 U.S.C. 154(b) by 0 days.

(21) Appl. No.: 11/912,693

(22) PCT Filed: Apr. 20, 2006

(86) PCT No.: PCT/CN2006/000735

§ 371 (c)(1),
(2), (4) Date: Aug. 6, 2008

(87) PCT Pub. No.: WO2006/114046

PCT Pub. Date: Nov. 2, 2006

(65) Prior Publication Data

US 2009/0058727 A1    Mar. 5, 2009

(30) Foreign Application Priority Data

Apr. 28, 2005    (CN) .................. 2005 1 0067903

(51) Int. Cl.
*H01Q 3/01* (2006.01)
(52) U.S. Cl. ...................... 342/377; 342/374
(58) Field of Classification Search ............. 342/372, 342/374, 377, 382, 378; 375/316, 347
See application file for complete search history.

(56) References Cited

U.S. PATENT DOCUMENTS

| 6,477,213 B1* | 11/2002 | Miyoshi et al. ............. 375/347 |
| 7,126,531 B2* | 10/2006 | Nakaya et al. ............. 342/377 |
| 2007/0147545 A1* | 6/2007 | Doi ............................ 375/316 |

FOREIGN PATENT DOCUMENTS

| CN | 1399425 | 2/2003 |
| CN | 1466392 | 1/2004 |
| JP | 2004-80191 A | 3/2004 |

* cited by examiner

*Primary Examiner*—Dao L Phan
(74) *Attorney, Agent, or Firm*—Merchant & Gould P.C.

(57) ABSTRACT

A method for processing an array antenna signal is disclosed, comprising steps of: a. determining the number of antenna units participating the processing of the array antenna signals and selecting antenna units to participate the array antenna signal processing from all the antenna units in the array antenna; b. performing signal estimation processing on received signals by all the antenna units selected in step a and obtaining a user feature parameter estimation; c. performing estimation of weight coefficients for all the antenna units of the array antenna based on the user feature parameter estimation obtained in step b; and d. receiving and/or transmitting the array antenna signals based on the weight coefficients estimated in step c. The method of the present invention can effectively reduce a computation amount of the array antenna signal processing and improve a reliability of a received signal.

11 Claims, 2 Drawing Sheets

METHOD FOR PROCESSING ARRAY ANTENNA SIGNAL

FIELD

The present disclosure relates to an array antenna technology, especially to a simplified method for processing array antenna signals.

BACKGROUND

An array antenna is composed of multiple antenna units according to a certain distribution mode, mainly used for improving an antenna system performance including gain. Each antenna unit in the array antenna is an independent unit and can be an omnidirectional antenna or a directional antenna. The distribution of antenna units can be linear, ring, plane or solid. According to the array antenna technology, all the antenna units cooperate to perform receiving and transmission of user signals in different environment. Generally, according to the array antenna technology, a weighting parameter of a transmission signal on each antenna unit is computed and determined by estimating a received signal and a combining receiving and/or transmission of the antenna array signal according to the computed weighting parameter. Specifically, according to the traditional antenna transmission technology, all the received signals on all the antenna units are processed to determine the weight coefficient of each antenna unit. Here, the processing of the received signals adopts technologies such as Receiving and Transmission Beam-forming, Receiving Diversity and Close Loop Transmit Diversity.

In the traditional technology, the processing of the array antenna signal based on the parameter estimation is as follows:

a) determining a number M of the antenna units in the currently used array antenna wherein the number of the antenna units is also called the dimension of the array antenna and each antenna unit corresponds to one-channel signal;

b) processing the received M-channel signals and obtaining a feature parameter estimation of the user wherein processing the received signals with different methods can obtain different feature parameters of the user, for example, if a user direction-of-arrival (DOA) is estimated on the received M-channel signals, then after the channel estimation, correlated matrix computation, spectrum estimation on the M-channel signals, the DOA of the user can be obtained and the obtained DOA is referred as the feature parameter of the user.

c) estimating the weight coefficients of all the antenna units based on the obtained feature parameters of the user wherein a function with the beam-forming weight coefficient as the feature parameter can be used to perform the estimation.

The above processing of the array antenna signals shows that the computation amount of the array antenna signals will increase with the increase of the antenna units and the main computation amount is to compute the weight coefficient of each antenna.

In addition, for a complex wireless environment, the array antenna receives the signals in a complex way. Generally, signal fading in different antenna unit is different. If an antenna unit is in a status of deep fading, the reliability of the received signal is reduced and in this case, it is necessary to solve the problem of how to improve the reliability of the received signal by effectively using all the antenna units.

SUMMARY

A main objective of the present invention is to provide a method for processing an array antenna signal, which can effectively reduce a computation amount of the array antenna signal processing and improve a reliability of a received signal.

In order to achieve the above objective, the present invention proposes a method for processing an array antenna signal, including steps of:

a. determining the number of antenna units participating the processing of the array antenna signals and selecting antenna units to participate the array antenna signal processing from all the antenna units in the array antenna;

b. performing signal estimation processing on received signals by all the antenna units selected in step a and obtaining a user feature parameter estimation;

c. performing estimation of weight coefficients for all the antenna units of the array antenna based on the user feature parameter estimation obtained in step b; and d. receiving and/or transmitting the array antenna signals based on the weight coefficients estimated in step c.

In step b, the signal estimation processing method is determined by the array antenna signal processing algorithm currently used by the array antenna. If the currently used array antenna signal processing algorithm is the transmission beam-forming algorithm, the signal estimation processing in step b is to perform a user direction-of-arrival estimation on a received signal; the user feature parameter is the direction-of-arrival; the signal estimation processing includes:

b1. estimating a channel estimation matrix of the user signal in the selected antenna unit;

b2. obtaining a space correlation matrix of the user according to an array channel impulse response on the selected antenna unit and obtaining a discrete spectrum estimation diagram of the user according to the array response vector of the selected antenna unit;

b3. estimating the direction-of-arrival of the user signal according to the discrete spectrum estimation diagram of the user.

In the above solution, the number of the antenna units in step a is determined according to the processing capacity of the system or according to the quality of the antenna units in receiving signals. The antenna units participating the array antenna signal processing selected in step a is selected according to the array antenna form or according to the quality of the antenna units in receiving signals. The weight coefficient estimation in step c is performed according to the function relating the user feature parameter and the weight coefficient. The function relating the user feature parameter and the weight coefficient adopted in step c is determined according to the array antenna form or according to the array antenna signal processing algorithm currently used by the array antenna.

The method for processing an array antenna signal of the present invention has the following advantages and features.

1) Since the processing dimension of the array signal is reduced by selecting part antenna units to perform the estimation of the weight coefficient, the computation amount and complexity of the array antenna signal processing is reduced in some extent.

2) The transmission effect of the whole array antenna to the user signal is guaranteed and all the antenna units are effectively used by using part antenna units to compute the user feature parameter and by estimating weight coefficients of all the antenna units when performing the weight coefficient estimation.

3) The antenna units participating the signal processing, which are of flexible modes and of high quality in receiving signals, can be selected according to the form of the array or according to the quality of the antenna units in receiving signals.

4) The extending method can be determined according to the form of the array or according to the array signal processing algorithm so that there can be multiple extending methods and the present invention can be better applicable.

DRAWINGS

DETAILED DESCRIPTION

A main idea of the present invention is to reduce a processing dimension of an array antenna signal and to perform a user feature parameter estimation on signals received by part antenna units and then to compute a weight coefficient of all the antenna units based on the estimated user feature parameter.

The adopted part antenna units are pre-selected according to the array antenna form or according to the quality of the antenna units in receiving signals. In the present invention, the weight coefficient of the array signal is determined according to the estimated user feature parameter. Therefore, the method of the present invention is applicable to the array signal processing method based on the user feature parameter.

Figure 1:
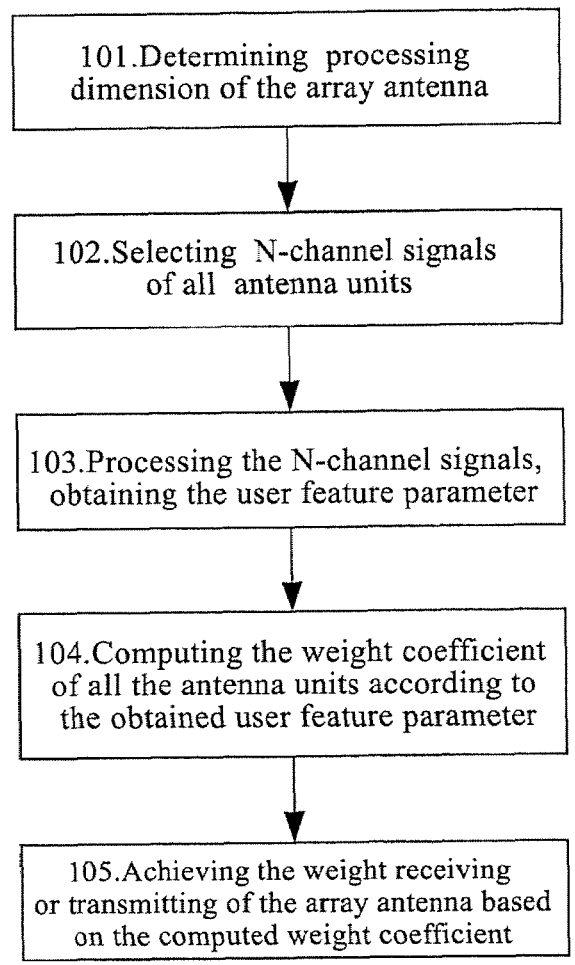
FIG. 1 is a flow chart of a processing method according to the present invention.

Suppose that the dimension of the array antenna is M, N (N≦M)-channel receiving signals are selected to be processed and the user feature parameter is obtained and a receiving/transmission weight coefficient of each antenna is further estimated. As shown in FIG. 1, the array antenna signal processing method based on the user feature parameter estimation includes the following steps.

Step 101: The signal processing dimension N(N≦M) of the M dimension array antenna is determined, i.e. the number of the antenna units to whose receiving signals will participate the processing is determined. The selection of the processing dimension can be pre-determined according to the processing capacity of the system or according to the quality of the antenna units in receiving signals.

Step 102: N-channel signals participating the weight coefficient estimation are selected from all the antenna units.

The selection of the N-channel signals can be determined according to the array form or according to the quality of the antenna units in receiving signals. When determining according to the array form, the basic principle is to keep the distance architecture of the array and the array aperture equivalent to the former array antenna and optimally not to delete the neighboring antenna units. Array distance refers to the distance between array antennas and array aperture refers to the largest size of the whole array antenna, for example, the array aperture of the linear array antenna is the linear length of the array antenna. When selecting according to the quality of the received signals, the N-channel signals can be selected according to the signal power, for example, the estimated power values of the M-channel received signals are $P_1 \geq P_2 \geq \ldots \geq P_M$, N-channel signals with the largest power can be selected to participate the weight coefficient estimation.

Step 103: The N-channel signals selected in step 102 undergo the signal estimation processing and a user feature parameter estimation $c_k$ is obtained. The signal estimation processing can obtain different user feature parameters by adopting different array signal processing algorithms. For example, the user direction-of-arrival is obtained by estimating the direction-of-arrival on the received signal; or the downlink forming parameter is determined by estimating the sequence of the beam (where the user signal locates) in the beam switching algorithm.

Step 104: The weight coefficient of all the antenna units is estimated based on the user feature parameter estimation $c_k$ obtained in step 103.

$$w = w(c_k), k=1, \ldots, K \quad (1)$$

$k=1, \ldots, K$ is the sequence of the user, w is the weight coefficient of the array antenna and $w(c_k)$ is the forming weight coefficient, which is a function of the feature parameter.

In this step, how to estimate the weighting parameter of the array antenna according to the user feature parameter estimation $c_k$ can be an algorithm selected according to the form of the array antenna or an algorithm selected according to the currently used array signal processing algorithm. Herein, the array signal processing algorithm isn't limited to a specific algorithm and the present invention is applicable to all the array signal processing algorithms based on the parameter estimation.

Step 105: The receiving and transmission of array antenna signals are achieved by using the estimated weight coefficient.

Figures 2A, 2B:
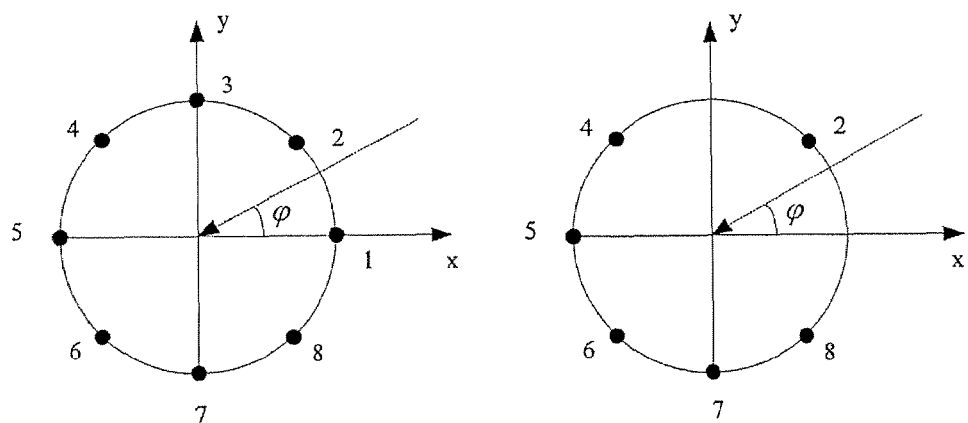
FIG. 2a is architecture diagram of an array antenna before simplification according to an embodiment of the present invention.
FIG. 2b is architecture diagram of an array antenna after simplification according to an embodiment of the present invention.
Figure 3:
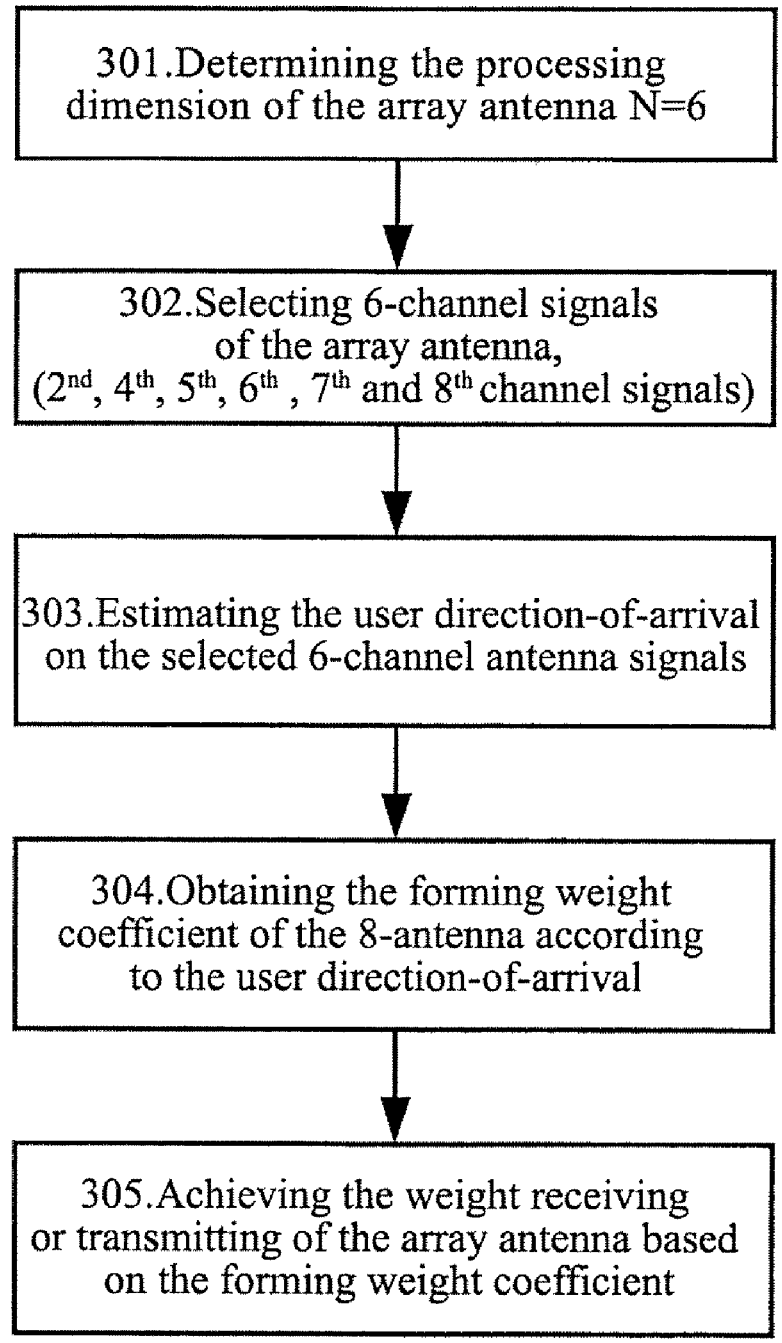
FIG. 3 is a flow chart of a method according to an embodiment of the present invention.

A specific embodiment will be explained in illustrating the realization process of the method of the present invention. As shown in FIG. 2, the array antenna used in this embodiment is a uniform ring array with 8 units, i.e. M=8, and the radius of the ring is 0.65λ (λ is the wavelength of the carrier). In this embodiment, as shown in FIG. 2b, the pre-determined signal processing dimension is 6, i.e. N=6 and units selected for signal processing are #2, #4, #5, #6, #7 and #8. In this embodiment, the array signal processing algorithm is the transmission beam-forming algorithm and correspondingly, the forming weight coefficient, i.e. the estimation method of the weight coefficient is the direction-of-arrival estimation beam-forming method. As shown in FIG. 3, the method for realizing the array antenna signal processing of the present embodiment includes the following steps.

Step 301~302: The processing dimension of the array antenna is determined as N=6 according to the form of the array antenna and 6-channel signals of the #2, #4, #5, #6, #7 and #8 antenna units are selected for estimating the weight coefficient.

Suppose the sequence of the 8-channel received signals are $e_m, m=1, \ldots, M$ respectively and is a L×1 dimension sequence wherein L is the sequence length of the received signals, and then the sequence of the 6-channel received signals for estimating the weight coefficient is $e_2, e_4, e_5, e_6, e_7, e_8$.

Step 303: Signal estimation processing is performed on the selected 6-channel received signals $e_2, e_4, e_5, e_6, e_7, e_8$. In the present embodiment, the signal estimation processing is the user direction-of-arrival estimation using the 6-channel received signals and the specific process includes the following steps.

Step 303*a*: The channel estimation matrix H of the user signal on the 6 antennas is firstly estimated:

H=[h$_2$,h$_4$,h$_5$,h$_6$,h$_7$,h$_8$]

The dimension of the matrix is 6×W, wherein W is the estimated window length of the channel estimation, and in this embodiment W=16. The channel estimation algorithm can be selected according to the characteristics of the system and this belongs to the prior art so will not be illustrated in detail here.

Step 303*b*: The space correlation matrix R of the user is obtained according to the array channel impulse responses on the 6 antenna units.

R=H$^H$H

H$^H$ represents the conjugate transpose computation and the space correlation matrix R of the user is the product of the matrix H with its conjugate transpose matrix.

Step 303*c*: The discrete spectrum estimation diagram of the user is obtained according to the array response vector of the 6 antenna units. In the present embodiment, the spectrum estimation method adopts the Bartlett spectrum estimation method, i.e.:

P(φ)=a$^H$(φ)Ra(φ)

a(φ) is the array response vector of the 6 antenna units, R is the space correlation matrix of the user obtained in step 303*b* and in the present embodiment, a(φ) is:

$$a_6(\varphi) = \begin{bmatrix} \exp\left(j2\pi R\cos\left(\varphi - \frac{2\pi}{8}\right)\right) \\ \exp\left(j2\pi R\cos\left(\varphi - \frac{6\pi}{8}\right)\right) \\ \exp\left(j2\pi R\cos\left(\varphi - \frac{8\pi}{8}\right)\right) \\ \exp\left(j2\pi R\cos\left(\varphi - \frac{10\pi}{8}\right)\right) \\ \exp\left(j2\pi R\cos\left(\varphi - \frac{12\pi}{8}\right)\right) \\ \exp\left(j2\pi R\cos\left(\varphi - \frac{14\pi}{8}\right)\right) \end{bmatrix}$$

φ is the discrete value of the azimuth and herein $$\varphi = [1°, 2°, \ldots, 360°] = \left[\frac{1 \times \pi}{180}, \frac{2 \times \pi}{180}, \ldots, 2\pi\right] \text{rad}.$$

For example, when $$\varphi = \frac{\pi}{2}, a_6\left(\frac{\pi}{2}\right)$$

is:

$$a_6\left(\frac{\pi}{2}\right) = \begin{bmatrix} 1.0000 + 0.000i \\ -0.9227 + 0.3856i \\ -0.7375 - 0.6753i \\ -0.9227 + 0.3856i \\ 1.0000 + 0.0000i \\ -0.9227 - 0.3856i \\ -0.7375 + 0.6753i \\ -0.9227 - 0.3856i \end{bmatrix};$$

Step 303*d*: The direction-of-arrival φ$_{user}$ of the user signal is estimated according to the discrete spectrum estimation diagram P(φ) of the user and then the estimated direction-of-arrival φ$_{user}$ is regarded as the user feature parameter estimation value.

φ$_{user}$=φ|p(φ)=max(p(φ))

Step 304: The weight coefficient of all the antenna units is estimated according to the obtained user feature parameter estimation φ$_{user}$. In the present embodiment, the weight coefficient of all the antenna units is estimated according to the array form and specifically, since the array antenna used in the present embodiment is the uniform ring array and the radius of the ring and the position of the antenna unit are already known, the angles between neighboring antenna units are the same. According to the angles between the antenna units and according to the radius, the relation between the array antenna forming weight coefficient and the user feature parameter estimation φ$_{user}$ is obtained and further the forming weight coefficient of the 8-antenna is obtained.

For example, if $$\varphi_{user} = 30° = \frac{\pi}{6},$$

the forming weight coefficient w is:

$$w = a_8^*(\varphi_{user}) = \begin{bmatrix} 1 \\ \exp\left(-j2\pi R\cos\left(\varphi_{user} - \frac{2\pi}{8}\right)\right) \\ \exp\left(-j2\pi R\cos\left(\varphi_{user} - \frac{4\pi}{8}\right)\right) \\ \exp\left(-j2\pi R\cos\left(\varphi_{user} - \frac{6\pi}{8}\right)\right) \\ \exp\left(-j2\pi R\cos\left(\varphi_{user} - \frac{8\pi}{8}\right)\right) \\ \exp\left(-j2\pi R\cos\left(\varphi_{user} - \frac{10\pi}{8}\right)\right) \\ \exp\left(-j2\pi R\cos\left(\varphi_{user} - \frac{12\pi}{8}\right)\right) \\ \exp\left(-j2\pi R\cos\left(\varphi_{user} - \frac{14\pi}{8}\right)\right) \end{bmatrix} = \begin{bmatrix} -0.9756 + 0.2194i \\ -0.8202 + 0.57521i \\ -0.3623 - 0.9321i \\ 0.5361 + 0.8442i \\ -0.9756 - 0.2194i \\ -0.8202 - 0.5721i \\ -0.3623 + 0.9321i \\ 0.5361 - 0.8442i \end{bmatrix}$$

a$_8$*(φ$_{user}$) represents the conjugate computation of the complex matrix a$_8$(φ$_{user}$).

Step 305: The weighted receiving and transmission of the array antenna signals are achieved based on the estimated forming weight coefficient.

The above is only the description on the preferred embodiments of the present invention and don't intend to limit the protection scope of the present invention.

What is claimed is:

1. A method for processing array antenna signals, comprising steps of:
   a. determining the number of antenna units participating the processing of the array antenna signals and selecting antenna units to participate the array antenna signal processing from all the antenna units in the array antenna;
   b. performing signal estimation processing on received signals by all the antenna units selected in step a and obtaining a user feature parameter estimation;
   c. performing estimation of weight coefficients for all the antenna units of the array antenna based on the user feature parameter estimation obtained in step b; and
   d. receiving and/or transmitting the array antenna signals based on the weight coefficients estimated in step c.

2. The method according to claim 1, wherein in step b, a method for the signal estimation processing is determined by the array antenna signal processing algorithm currently used by the array antenna.

3. The method according to claim 2, wherein if the currently used array antenna signal processing algorithm is transmission beam-forming algorithm, the signal estimation processing in step b is to perform a user direction-of-arrival estimation on a received signal; the user feature parameter is the direction-of-arrival; the signal estimation processing comprises:
   b1. estimating a channel estimation matrix of user signal in the selected antenna unit;
   b2. obtaining a space correlation matrix of the user according to an array channel impulse response on the selected antenna unit and obtaining a discrete spectrum estimation diagram of the user according to the array response vector of the selected antenna unit; and
   b3. estimating the direction-of-arrival of the user signal according to the discrete spectrum estimation diagram of the user.

4. The method according to claim 1 wherein the number of the antenna units in step a is determined according to the processing capacity of the system.

5. The method according to claim 1, wherein the antenna units participating the array antenna signal processing in step a is selected according to the array antenna form.

6. The method according to claim 1, wherein selecting the antenna units participating the array antenna signal processing in step a includes selecting the antenna units according to the quality of the antenna units in receiving signals, wherein the antenna units with largest power in receiving signals are selected.

7. The method according to claim 1, wherein the weight coefficient estimation in step c is performed according to the function relating the user feature parameter and the weight coefficient.

8. The method according to claim 7, wherein the function relating the user feature parameter and the weight coefficient adopted in step c is determined according to the array antenna form.

9. The method according to claim 1, wherein the number of the antenna units in step a is determined according to the quality of the antenna units in receiving signals.

10. The method according to claim 1, wherein the antenna units participating the array antenna signal processing in step a is selected according to the quality of the antenna units in receiving signals.

11. The method according to claim 7, wherein the function relating the user feature parameter and the weight coefficient adopted in step c is determined according to the array antenna signal processing algorithm currently used by the array antenna.

* * * * *